United States Patent
Kindelan

[11] 3,890,057
[45] June 17, 1975

[54] MULTI-STATION DRILL APPARATUS

[75] Inventor: James J. Kindelan, Greensburg, Pa.

[73] Assignee: Overmyer Mould Company of Pennsylvania, Greensburg, Pa.

[22] Filed: June 13, 1974

[21] Appl. No.: 478,922

[52] U.S. Cl. .................. 408/43; 408/52; 408/53; 408/71; 408/99
[51] Int. Cl. ......................................... B23b 39/20
[58] Field of Search ........... 408/42, 43, 50, 52, 53, 408/71, 91, 99, 111, 234; 90/14

[56] References Cited
UNITED STATES PATENTS
2,506,424  5/1950  Jonke .................................. 408/71

*Primary Examiner*—Gil Weidenfeld
*Attorney, Agent, or Firm*—Brown, Murray, Flick & Peckham

[57] ABSTRACT

A multi-station apparatus for drilling closely-spaced holes in a plurality of workpieces while individually supported by a turntable. A frame supports the turntable with their axes of rotation extending vertically such that two of the turntables lie within one of two spaced-apart vertical planes and the two remaining turntables lie within the other vertical plane. Parallel line shafts extend horizontally below the turntables and carry bevel gears that mesh with other bevel gears secured to the turntables. The line shafts are interconnected by a train of spur gears that are, in turn, rotated by a handwheel having a pin extending into an indexing plate for locking the gear drive and thereby holding the turntables in a desired adjusted position. The vertical columns extend above the turntables at horizontally-spaced locations such that the turntables lie between the columns. Each column carries a radial arm with its extended end carrying pairs of drill means, one for each turntable. Piston and cylinder assemblies advance the drill means toward a workpiece while supported on the turntable and stops are provided to limit displacement of the drill means.

12 Claims, 5 Drawing Figures

PATENTED JUN 17 1975  3,890,057

SHEET 1

MULTI-STATION DRILL APPARATUS

BACKGROUND OF THE INVENTION

This invention relates to a multi-station apparatus for carrying out closely-spaced drilling operations upon each of a plurality of workpieces. More particularly, the present invention relates to providing mechanically positioned turntables for drilling closely-spaced holes in workpieces.

It is a known practice to employ a multi-drilling head to carry out a plurality of simultaneous drilling operations upon a workpiece. The use of such a multi-drilling head has many desirable attributes including a reduction of the necessary time for drilling a plurality of holes in a given workpiece to an almost minimum and thereby reducing machining costs. On the other hand, the capital investment required for such multi-drilling heads is substantial and they cannot always be utilized for maximum benefit because, for example, they lack a certain degree of versatility in regard to their adaption to different conditions and requirements. It has been discovered that conventional multi-drilling heads cannot be satisfactorily employed to drill closely-spaced holes in a workpiece because there is an inherent minimum separation distance between adjacent drill axes which is determinative of the minimum distance at which two adjacent holes can be drilled. Thus, for example, the diameter of the chucks and the size of the drives are some of the factors affecting the spacing between the drill axes. The problems attending the drilling of closely-spaced holes become particularly acute when the holes are to be closely spaced within a small circle.

SUMMARY OF THE INVENTION

It is the principal object of the present invention to provide an improved apparatus for multi-drilling of closely adjacent holes in a workpiece in a more efficient and rapid manner.

It is a further object of the present invention to provide an improved apparatus for simultaneous drilling of closely-spaced holes in a plurality of horizontally, spaced-apart and rotatably positioned workpieces.

It is another object of the present invention to provide an improved multi-station apparatus for drilling closely-spaced holes about a circumference of a small diameter circle which is smaller than can be accommodated by the use of a conventional multi-headed drill device.

In accordance with this invention, a multi-station apparatus is provided for carrying out closely-spaced drilling operations upon a plurality of workpieces, the apparatus including a plurality of turntables having vertical axes of rotation for defining workpiece support stations, a support member for carrying the turntables at horizontally, spaced-apart locations with the vertical axes of the turntables lying within at least one vertical plane, an indexing drive connected to the turntables for rotation thereof about their respective vertical axes, at least one support column extending vertically above the turntables and horizontally spaced therefrom, a radial arm carried by the support column to extend above the turntables and in a direction toward the vertical plane, drill means carried by the radial arm to drill closely-spaced holes in workpieces while supported by the turntables, and piston and cylinder assemblies for displacing the drill means toward the turntables.

In the preferred form of the present invention, an indexing plate is used to lock two parallel line shafts including bevel gears for rotating turntables when arranged as side-by-side pairs. A train of meshing spur gears is provided to drivingly interconnect the line shafts.

These features and advantages of the present invention as well as others will be more fully understood when the following description is read in light of the accompanying drawings, in which.

Figure 1:
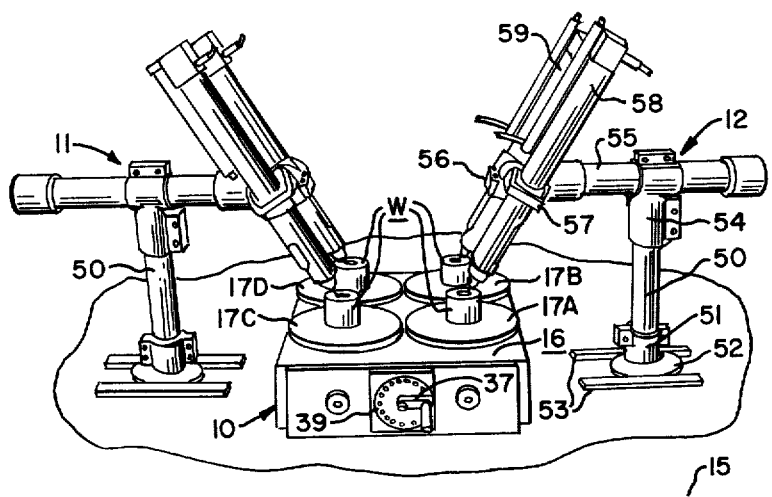
FIG. 1 is a perspective view of the preferred form of the multi-station apparatus for carrying out drilling operations on workpieces according to the present invention.

In FIG. 1, there is illustrated a multi-station support apparatus 10 for a plurality of workpieces W at horizontally, spaced-apart locations. Drill apparatus 11 and 12 are horizontally spaced from the opposite sides of the support apparatus 10. It will be understood by those skilled in the art that each of the apparatus 10, 11 and 12 is rigidly secured in their spaced-apart relationships by a foundation supported frame structure in a suitable manner.

Figure 2:
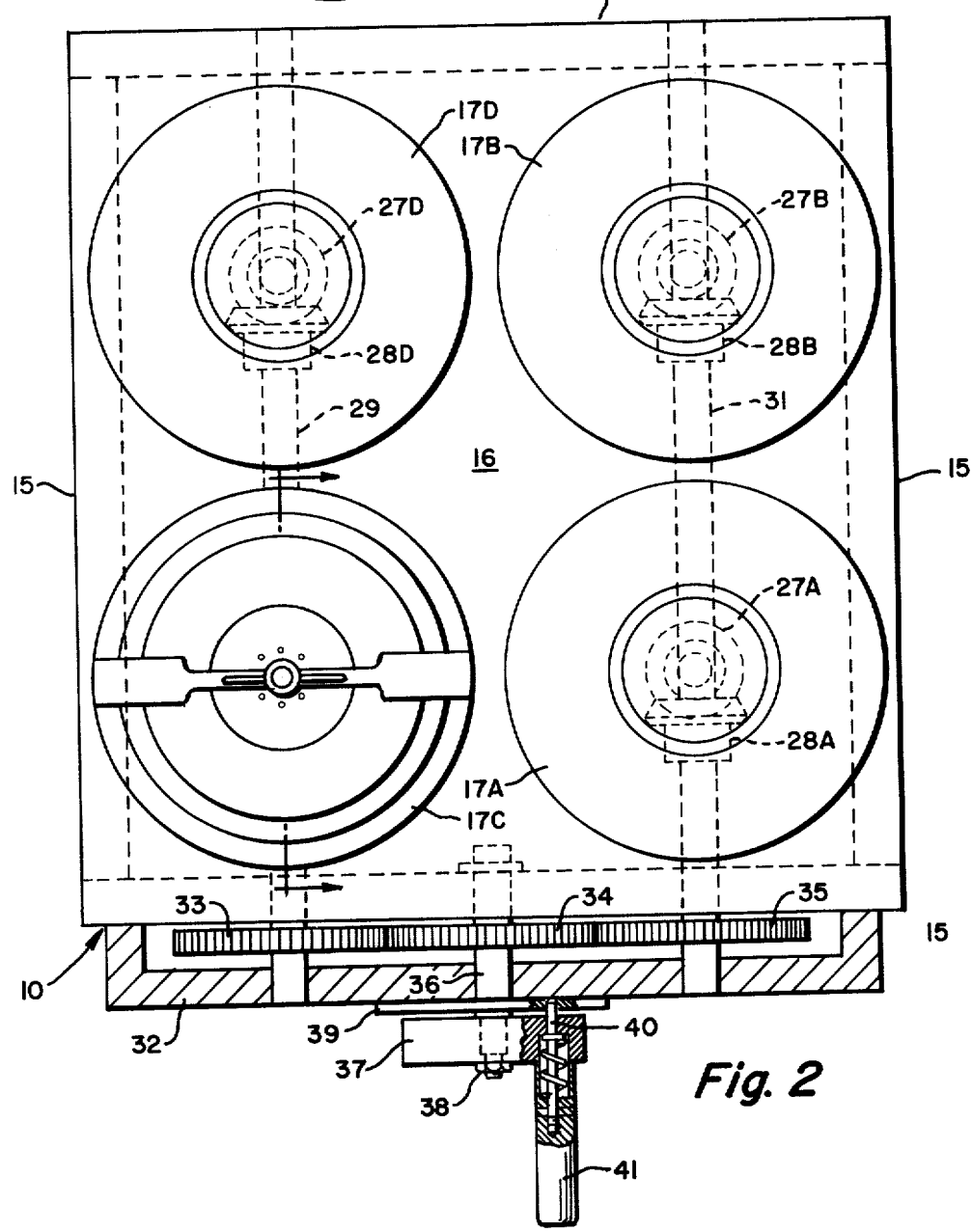
FIG. 2 is a plan view of the workpiece support table shown in FIG. 1.
Figure 3:
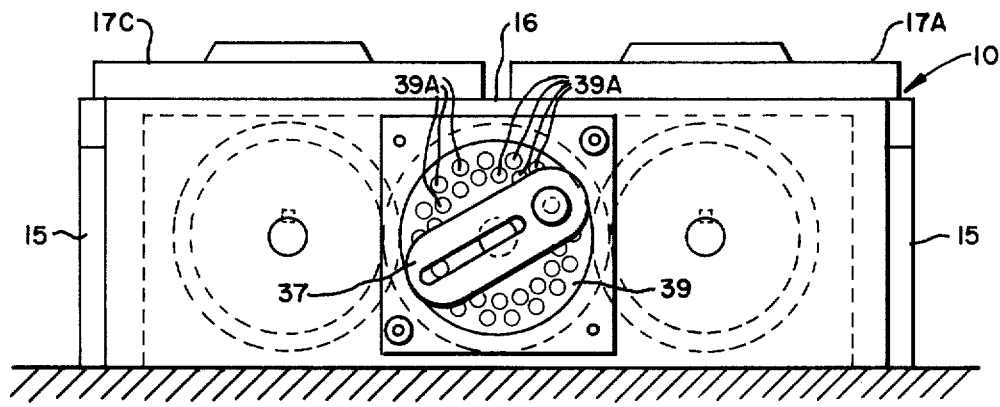
FIG. 3 is a front elevational view of the apparatus shown in FIG. 2.
Figure 4:
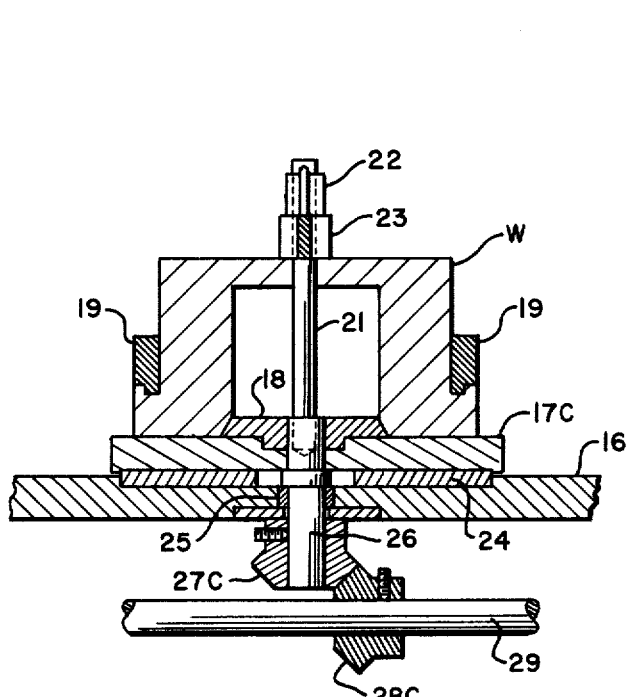
FIG. 4 is a sectional view taken along line IV—IV of FIG. 2 and including an illustration of a workpiece clamped to a turntable.

The multi-station workpiece support apparatus 10 includes, as illustrated in FIGS. 2-4, a rectangularly-shaped frame made up of side plates 15 and a top plate 16. Disc-shaped turntables 17A, 17B, 17C and 17D are horizontally spaced from each other such that the vertical rotational axes of the turntables located at the right-hand side of the frame, as one views FIG. 2 and 3, lie within a first vertical plane. The remaining two turntables which are situated on the left-hand side of the frame as one views FIGS. 2 and 3, have their vertical axes of rotation located within a second vertical plane which is parallel with and horizontally spaced from the vertical plane containing the turntables at the right-hand side of the frame. While four turntables are illustrated, it will be apparent to those skilled in the art that turntables 17A and 17B may be all that is needed and there provided. Alternatively, the number of turntables may be obviously increased from that shown in the drawings.

FIG. 4 is a typical illustration of the construction details of the turntables. The top surface of the turntables defines a central counterbore for receiving a seating plate 18 defining a tapered edge surface for centrally locating the workpiece W upon the top surface of the turntable 17C. In instances where the workpiece is made up of two halves, then bars 19 are employed to hold the workpiece together during the drilling operations. The workpiece is clamped onto the turntable by a drawrod 21 having one of its threaded ends in a tapped hole in the turntable and the other threaded end receives a nut 22 for developing a clamping force upon the workpiece via a bar 23. The undersurface of the turntable 17C has a machined recess for supporting upon a thrust bearing plate 24 that is, in turn, received within a mechanical recess in the top plate 16. A bushing 25 rotatably supports a shaft 26 which is connected at one end to the turntable and extends downwardly through the table top along the rotational axis of the turntable. A miter gear 27C is secured at the lower end of the shaft 26. The gear 27C is driven by a miter gear 28C keyed to a line shaft 29.

As best shown in FIGS. 2 and 3, the line shaft 29 also includes a miter gear 28D for driving a meshing miter gear 27D connected to the turntable 17D in a similar manner as described in regard to the turntable 17C. The opposite ends of the line shaft 29 are rotatably supported by the side plates 15. A line shaft 31 extends parallel with the line shaft 29 and carries spaced-apart miter gears 28A and 28B which mesh with miter gears 27A and 27B, respectively. The gears 27A and 27B are mounted onto shafts secured to the turntables in the manner already described with regard to turntable 17C and shown in FIG. 4. The line shafts 29 and 31 project horizontally from the front of the table 16 where a gear box 32 encloses a train of meshing spur gears 33, 34 and 35. The spur gears 33 and 35 are keyed to the line shafts 29 and 31, respectively, while the spur gear 34 is rotatably mounted by an idler shaft 36 having an extended end projecting from the gear box 32 into a slotted plate 37 and secured thereto by a nut 38. An indexing plate 39 is attached to the gear box 32 such that one of a plurality of indexing holes 39A is arranged at spaced-apart locations about inscribed circles with the centers thereof corresponding to the axis of the shaft 36. Two series of indexing holes 39A are shown in FIG. 3. Any one of the indexing holes may be selected to receive a spring-biased indexing rod 40 supported by a handle 41. By withdrawing the indexing pin from an indexing hole, the handle 41 is unlocked for rotating the spur gear 34. The gear 34, in turn, drives both of the spur gears 33 and 35 causing the line shafts 29 and 31 to rotate which, in turn, produces simultaneous rotation of each turntable 17A–17D since all of the turntables are connected to the line shafts by bevel gears. In this way, a workpiece clamped to each turntable is angularly indexed and then locked in place by selecting a different one of the indexing holes.

Figure 5:
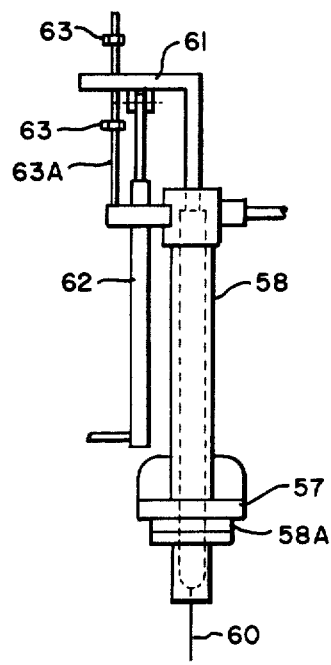
FIG. 5 is an enlarged view of one of the drill apparatus shown in FIG. 1.

In FIG. 1, the drill apparatus 11 and 12 are essentially duplicate apparatus and, therefore, it is deemed necessary to describe only one of the apparatus, namely, drill apparatus 12. This apparatus includes a vertical column 50 which is vertically extendible and held in place by a compression clamp 51 that has a flange 52 bolted to the support structure. Parallel rails 53 guide the column when it is moved relative to the apparatus 10 and again bolted in place. A clamp fixture 54 is secured to the upper end of the column and serves to clamp a radial arm 55 in an extended manner. A clamping fixture 56 is attached to the extended end of the radial arm 55 most adjacent the workpiece support apparatus 10. The clamp fixture 56 includes a crossarm 57 extending in a horizontal direction parallel to the plane containing the rotational axes of the turntables. The crossarm 57 is constructed so as to support at its opposite ends separate high-speed drill apparatus 58 and 59, respectively. As best illustrated in FIG. 5, the drill apparatus 58 includes a tubular housing that is attached to the crossarms 57 by a mounting flange 58A. At the top of the housing of the drill apparatus 58, there is located an L-shaped arm 61 having its vertical leg connected to a drill spindle extendible from the housing of the drill apparatus. The horizontal leg of the arm 61 is connected by a clevis mounting to the rod end of a piston and cylinder assembly 62. Adjustable stops 63 are threadedly positioned along a rod 63A that is supported by the piston and cylinder assembly and extends through an opening in the horizontal leg of the L-shaped arm 61.

Upon actuation of the piston and cylinder assembly 62, the high-speed drill means is advanced or retracted out of its housing whereby the drill 60 is brought into metalworking relation with one of the workpieces while clamped onto one of the turntables as clearly apparent from FIG. 1. After drilling a hole in each workpiece, the drill means is retracted using the associated piston and cylinder assembly following which the workpieces are rotatably positioned by rotating the turntables which are then held in their newly-adjusted positions by the indexing plate for the next drilling operation. This construction and arrangement of parts makes possible the efficient and accurate drilling of closely-adjacent holes in a workpiece at spaced-apart locations about the periphery of a small diameter circle.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A multi-station apparatus for carrying out metalworking operations upon a plurality of workpieces, said apparatus comprising:
   a plurality of turntables having vertical axes of rotation for supporting workpieces;
   support means carrying said turntables for rotation at horizontally-spaced locations with said vertical axes lying within a vertical plane;
   drive means carried by said support means for rotating said turntables simultaneously about said vertical axes;
   indexing means for locking said turntables at a desired position after rotation by said drive means;
   a support column extending vertically above said turntables and horizontally spaced therefrom;
   a radial arm extending from said support column toward said vertical plane;
   tool means carried by said radial arm for each of said plurality of turntables; and
   means for displacing said tool means in a direction toward said turntables for performing spaced machining operations upon each workpiece while supported by the turntables.

2. The apparatus according to claim 1 wherein said drive means includes the combination of a line shaft extending horizontally below said turntables, a miter gear coupled to each turntable, miter gears spaced along said line shaft for meshing with the miter gears coupled to the turntables, and handle means for rotating said line shaft and thereby produce simultaneous rotation of said turntables.

3. The apparatus according to claim 2 wherein said indexing means include a plate member having a plurality of indexing holes arranged at spaced-apart locations about an inscribed circle on the plate, and an indexing pin carried by said handle means for cooperatively engaging each of said indexing holes.

4. The apparatus according to claim 1 further comprising adjustable stop means for limiting displacement of said tool means relative to said turntables.

5. The apparatus according to claim 4 wherein said means for displacing include a piston and cylinder assembly operatively connected between said tool means and said radial arm, and wherein said tool means are further defined as a pneumatically-driven drill.

6. The apparatus according to claim 1 further comprising an annular thrust plate for rotatably supporting each of said plurality of turntables upon said support means.

7. The apparatus according to claim 1 further comprising threaded fastening means carried by each turntable for securing a workpiece thereto.

8. A multi-station apparatus for carrying out closely-spaced drilling operations upon a plurality of workpieces; said apparatus comprising:
- at least four turntables having vertical axes of rotation for defining workpiece support stations,
- a support member carrying said turntables at horizontally, spaced-apart locations with the vertical axes of two turntables lying within one of two spaced-apart vertical planes; and with the vertical axes of the remaining two turntables lying within the other vertical plane;
- an indexing drive interconnecting said turntables for simultaneous rotation of the turntables about their respective vertical axes;
- two support columns extending vertically above said turntables, said columns being horizontally spaced apart such that said turntables lie therebetween;
- a radial arm carried by each of said support columns to extend above said turntables and to extend in a direction toward said vertical planes;
- drill means for each turntable carried by one of the radial arms to drill closely-spaced holes into a workpiece while supported by the turntable; and
- means for displacing each drill means toward said turntable.

9. The apparatus according to claim 8 wherein said vertical planes are parallel.

10. The apparatus according to claim 9 wherein said indexing drive includes the combination of:
- two horizontal line shafts extending below said turntable in a direction parallel with said vertical planes;
- a miter gear coupled to and extending downwardly from each of said turntables;
- two drive meter gears spaced along each of said line shafts for meshing with the miter gears of the turntables; and
- a train of gears for interconnecting said line shafts.

11. The apparatus according to claim 10 wherein said indexing drive further includes an indexing plate carried by said support member, said indexing plate having a plurality of indexing holes arranged at spaced-apart locations about an inscribed circle, a drive shaft extending through said indexing plate for rotating said train of gears, a handle secured to said drive shaft, an index pin extendible from said handle into a preselected indexing hole.

12. The apparatus according to claim 8 further comprising threaded fastening means carried by each of said turntables for clamping a workpiece thereto.

* * * * *